US009409825B2

(12) United States Patent
Chen

(10) Patent No.: US 9,409,825 B2
(45) Date of Patent: Aug. 9, 2016

(54) GRANULATION OF FINE POWDER

(71) Applicant: Los Alamos National Security, LLC, Los Alamos, NM (US)

(72) Inventor: Ching-Fong Chen, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 275 days.

(21) Appl. No.: 13/971,157

(22) Filed: Aug. 20, 2013

(65) Prior Publication Data

US 2015/0054184 A1  Feb. 26, 2015

(51) Int. Cl.
*C04B 35/51* (2006.01)
*C04B 35/626* (2006.01)

(52) U.S. Cl.
CPC ............ C04B 35/51 (2013.01); C04B 35/6262 (2013.01); C04B 35/62695 (2013.01); *C04B 2235/3229* (2013.01); *C04B 2235/5409* (2013.01); *C04B 2235/604* (2013.01); *C04B 2235/608* (2013.01); *C04B 2235/77* (2013.01)

(58) Field of Classification Search
CPC ......... C04B 35/51; G21C 21/02; G21C 3/623
USPC .......................................................... 264/0.5
See application file for complete search history.

(56) References Cited

U.S. PATENT DOCUMENTS

| | | | |
|---|---|---|---|
| 3,806,565 A * | 4/1974 | Langrod | ................. G21C 3/623 264/0.5 |
| 3,992,494 A | 11/1976 | Holden | |
| 4,020,131 A | 4/1977 | Feraday | |
| 4,061,700 A | 12/1977 | Gallivan | |
| 4,138,360 A | 2/1979 | Gallivan | |
| 4,247,495 A * | 1/1981 | Ennerst | .................. G21C 3/623 264/0.5 |
| 4,381,281 A | 4/1983 | Lang | |
| 4,382,885 A | 5/1983 | Haas | |
| 4,383,953 A | 5/1983 | Larson | |
| 4,389,341 A | 6/1983 | Gaines, Jr. et al. | |
| 4,432,915 A | 2/1984 | Gallivan | |
| 4,444,606 A | 4/1984 | Bertrand | |
| 5,487,855 A | 1/1996 | Moeggengourg et al. | |
| 5,902,761 A | 5/1999 | Oda et al. | |

(Continued)

OTHER PUBLICATIONS

Agrawal et al., "Pharmaceutical Processing—A Review on Wet Granulation Technology," International Journal of Pharmaceutical Frontier Research ("JPFR"), Apr.-Jun. 2011; vol. 1, pp. 65-83.

(Continued)

*Primary Examiner* — Timothy Kennedy
(74) *Attorney, Agent, or Firm* — Lewis Roca Rothgerber Christie LLP

(57) ABSTRACT

A mixture of fine powder including thorium oxide was converted to granulated powder by forming a first-green-body and heat treating the first-green-body at a high temperature to strengthen the first-green-body followed by granulation by crushing or milling the heat-treated first-green-body. The granulated powder was achieved by screening through a combination of sieves to achieve the desired granule size distribution. The granulated powder relies on the thermal bonding to maintain its shape and structure. The granulated powder contains no organic binder and can be stored in a radioactive or other extreme environment. The granulated powder was pressed and sintered to form a dense compact with a higher density and more uniform pore size distribution.

18 Claims, 2 Drawing Sheets

(56) References Cited

U.S. PATENT DOCUMENTS

| | | | |
|---|---|---|---|
| 6,137,025 | A | 10/2000 | Ebbinghaus et al. |
| 6,320,091 | B1 | 11/2001 | Ebbinghaus et al. |
| 6,852,245 | B2 | 2/2005 | Harada |
| 7,402,337 | B2 | 7/2008 | Takaya et al. |
| 7,416,690 | B2 | 8/2008 | Haun |
| 7,799,111 | B2 | 9/2010 | Gollob et al. |
| 7,858,023 | B2 | 12/2010 | Enokido et al. |
| 2011/0140298 | A1 | 6/2011 | Politi et al. |

OTHER PUBLICATIONS

Haack et al., "The TOPO Granulation Technology Used in the Manufacture of Effervescent Tablets," TechnoPharm, 2012, vol. 2, No. 3, pp. 186-191.

Joseph Remington Wood, "Tablet Manufacture, its History, Pharmacy, and Practice," J.B. Lippincott Company, Philadelphia & London, 1906.

"Principles of Ceramics Processing", 2nd edition, J. S. Reed, John Wiley & Sons, New York, 1988, pp. 69-70; 378-390; 397-413; 418-439; 638.

Pringuet et al., "Granulating fine powders into millimetric spheres with a multiscale porosity: The case of titania," Microporous and Mesoporous Materials, 2011, vol. 140, pp. 17-24.

Tardos et al., "Critical parameters and limiting conditions in binder granulation of fine powders," Powder Technology, 1997, vol. 94, pp. 245-258.

Tousey, "The Granulation Process 101—Basic Technologies for Tablet Making," Pharmaceutical Technology, Tableting & Granulation, pp. 8-13.

Watano et al., "Microgranulation of fine powders by a novel rotating fluidized bed granulator," Powder Technology, 2003, vol. 131, pp. 250-255.

* cited by examiner

GRANULATION OF FINE POWDER

STATEMENT REGARDING FEDERAL RIGHTS

This invention was made with government support under Contract No. DE-AC52-06NA25396 awarded by the U.S. Department of Energy. The government has certain rights in the invention.

FIELD OF THE INVENTION

This invention relates generally to the granulation of fine powder and more particularly to the granulation of radioactive fine powder.

BACKGROUND OF THE INVENTION

Wet and dry pressing are widely practiced forming processes for compaction and shaping of fine powder using rigid dies or flexible molds (see, for example, J. S. Reed, "Principles of Ceramic Processing, $2^{nd}$ edition, John Wiley & Sons, New York, 1988, incorporated by reference). These process have been used in the preparation of a wide variety of products including medicinal pellets, household pellet products such as bleach pellets for the swimming pool, magnetic and dielectric ceramics, various fine-grained technical alumina including chip carriers and spark plugs, engineering ceramics such as cutting tools and refractory sensors, ceramic titles and porcelain products, and coarse-grained refractories, grinding wheels, structural clay products, and nuclear fuel rods.

Objects pressed from powder are known in the art as green bodies. Green bodies are not very dense, but can be converted to hard dense compacts by sintering, which involves heating to temperatures that promote fusion of particles making up the green body.

Fine powder does not flow easily into a die because of high surface friction among the individual powder particles. The industrial practice is to convert fine powder into uniformly coarse powder by a process called granulation (see for example, J. R. Wood, "Tablet Manufacture, Its History, Pharmacy and Practice, J. B. Lippincott Company, Philadelphia & London, 1906, incorporated by reference). Granulated powder flows more easily into dies. Granulated powder is composed of deformable granules that are stable under ambient conditions.

Organic binders and plasticizers are sometimes added to granulated powder. These organic additives serve as a deformable medium and are believed to play a role in retaining the shape and structure of the granule. However, these organic additives can degrade in a radioactive environment. If the granulated powder itself were composed of radioactive materials, the emitted radioactivity would degrade the organic additives. Granulated radioactive powder may be needed for applications such as for nuclear fuel applications. Thus, there is a need for granulated powder of radioactive materials that is deformable and is also free from organic additives such as binders and plasticizers.

SUMMARY OF THE INVENTION

A process for granulating fine powder comprises forming a first-green-body from a fine powder that comprises radioactive fine powder. The first-green-body is quite weak and can barely maintain its shape and structure but can be strengthened by heat treating at a high temperature. The heat treated first-green-body is then granulated by crushing or milling or by some other suitable method, followed by filtering the crushed or milled material through a suitable filtering device such as a screen or sieve to provide granulated radioactive powder that may have a desired granule size distribution. This granulated powder does not rely on any organic binder to maintain its shape and structure. It instead relies on the thermal bonding among the fine powders to maintain its shape and structure. This granulated powder flows easily into a die press, and may be used to prepare radioactive compacts by first forming a second-green-body from the granulated radioactive powder. The weak thermal bonding allows the granulated powder to be deformed easily similar to the function of organic binder so that the second-green-body can have a higher green density and more uniform pore distribution, The second-green-body can then be sintered under conditions effective for forming a dense radioactive compact.

A process for forming a compact is provided that comprises forming a first-green-body from fine powder of at least one radioactive compound, heating the green body at temperatures effective for increasing the strength of the first-green-body so that it maintains its shape and structure. The weak bonding allows the granule powder to be crushed easily similar to the function of organic binder. This granulated powder flows easily into a die press, and may be used to prepare radioactive compacts by first forming a second-green-body from the granulated radioactive powder and sintering the second-green body under conditions effective for forming a dense radioactive compact.

DETAILED DESCRIPTION

Figure 1:
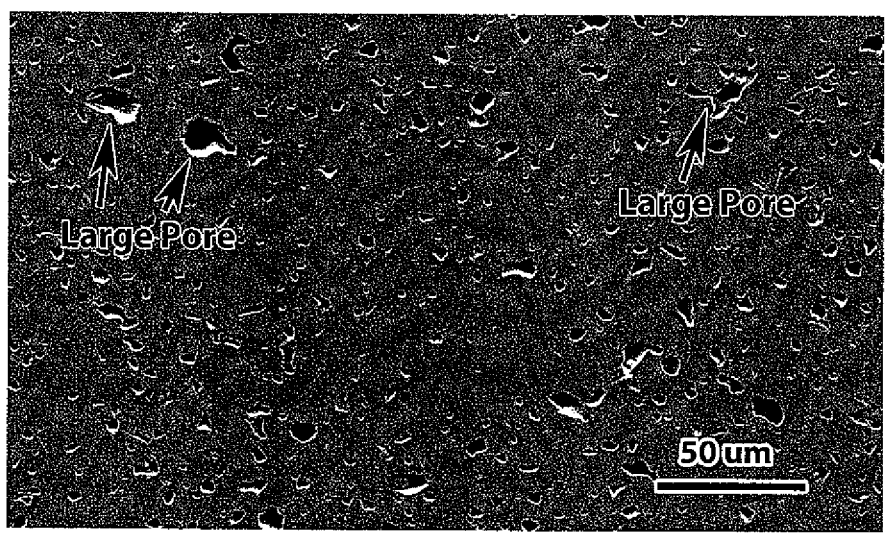
FIG. 1 is a scanning electron micrograph showing the non-uniform pore distribution of a sample processed from Example 5.

An embodiment process for forming granulated powder involves preparing a mixture of a fine powder without an organic binder and forming a first-green-body by applying pressure to the fine powder in a die or mold. The first-green-body is heat treated to improve bonding so that the heat treated first-green-body maintains its shape and structure. The heat treated first-green-body is crushed, milled, or the like to form granules that are filtered using a sieve, screen, or the like, to form granulated powder having a desired granule size or distribution of sizes.

The fine powder, which is used to form granules, has an average particle size of 0.01 to 1000 microns and preferably an average particle size between 0.1 to 100 microns. Fine powders include non-radioactive compounds and radioactive compounds. The pressure is applied to the fine powder by any suitable pressing method effective for forming green bodies from fine powder. Dry pressing may be used to form green bodies. Uniaxial pressing may be used. Another example of a suitable conventional pressing method for forming green bodies is known in the art as cold isostatic pressing (CIP), which is a method that uses hydraulic oil or water as a pressing medium for applying pressure from all directions (i.e. isostatically). Another suitable pressing method is dry bag isostatic pressing, which uses uniaxial pressing action from the top and bottom combined with the rubber bag surrounding the part from the side using pneumatic pressure to achieve a better uniformity in density distribution. Another method is the roll compaction, which compact the powders or granules using two rotating rollers. The pressure applied to the starting powder should be effective for forming the green body. A pressure of from 1 psi to 40,000 psi (pound per square inch) may be used, preferably a pressure from 10,000 to 20,000 psi. There is no particular restriction on the shape, size, diameter, length, width, depth, or size of the green body. The dimensions will depend on the shape and size of the die used to form the green body. Shapes include, but are not limited to, a disc shape, a square shape, and a rectangular shape. Other shapes can be obtained from a suitable die The first-green-body is heat treated under conditions effective for producing weak thermal bonding for maintaining shape and structure but weak enough that milling, crushing, or some other suitable granulation process may be used to convert the heat treated first-green-body into granulated powder.

The heat treated first-green-body is weakly bonded and is converted to granulated powder. The granulated powder can flow freely into a die, The weak bonding that holds a granule together is strong enough to maintain the shape and structure of the granule as it flows into a die, but weak enough for the granule to be deformed by a pressing action. Deforming the granulated powder in a die press results in a compact with a higher pressed density and a more uniform pore distribution than what would have been achieved by using the fine powder.

Heat treating temperatures useful for bonding the first-green-body will depend on the composition of the fine powder used to form the first-green-body. Effective temperatures tend to be in a range of from 20° C. to 2000° C. Temperatures from 400° C. to 1500° C. temperature range may conveniently employed for in bonding for fine powders. Bonding at high temperature reduces the surface area of the fine powder. It is desirable to achieve a slight reduction in the surface area so that the weak bonding can be achieved. If the surface area is reduced too much, then the bonding within the granulated powders will be too strong to be deformed during a pressing action.

Any crushing method effective for forming granules may be used to the heat treated first-green-body. Effective crushing may be accomplished using mortar and pestal, jaw crushing, a hammer, miffing, and the like can be used.

Any reasonable screening method can be used to screen the granules. Conventional screening with a stainless steel sieve, brass sieve, steel wire mesh, can be used. The screen size for screening will depend on the desired granule sizes. Any reasonable screen or screen combination can be used. Generally, −10/+325, −20/+325, −10/−275, −20/275, −100/+325 combination can be used. In this invention, a "−" implies pass, "+" implies does not pass and is retained on the screen. The numeric number implies mesh size. For example, 10 implies 10 mesh per inch. The larger mesh number means a larger number of mesh per inch, which implies smaller mesh opening size. Therefore, −10 implies granules pass through 10 mesh size. "+325" implies granules do not pass through 325 mesh and retain on the 325 mesh screen. The granule powder has an average granule size between 1 to 3000 microns and preferably has an average granule size between 10 to 1000 microns.

Pressing the granulated powder provides a second-green-compact with higher green compaction density and more uniform green density distribution than pressing fine powder which is not granulated. The density of the sintered compact product is expected to be higher than the density of a sintered compact product prepared from a green body made by conventional dry pressing fine powder without using the granulation treatment. Alternatively, the granulated powder can be used in isostatic pressing with flexible rubber molds in a pressured liquid vessel, dry bag isostatic pressing, or in roll pressing (also known as roll compaction).

In an embodiment, radioactive fine powder is converted to granulated radioactive powder. Organic binders are not be included with the radioactive fine powder, which will allow for storage of radioactive granulated powder without fear of degradation from emitted radioactivity. Radioactive granulated powder may include one or more compounds of radioactive elements such as Th, Pa, U, Np, Pu, Am, Cm, Bk. These compounds include, but are not limited to, oxides, nitrides, fluorides, chlorides, bromides, iodides, sulfides, and combinations of these types of compounds. The granulated powder prepared from such fine powder may be stored in an extreme environment such as high heat because they do not include an organic binder that would otherwise suffer degradation.

The following non-limiting EXAMPLES include detailed procedures for making final-granules using fine powders of thorium oxide and cerium oxide.

EXAMPLE 1

Preparation of powder mixture of $CeO_2$ and $ThO_2$. 17.20 g of $CeO_2$ powders and 237.60 g of $ThO_2$ powders were added to a 500 ml polyethylene bottle filled with 12.7 mm size high purity alumina grinding media and mixed for 2 hours on a roller mill. The dry mixed $ThO_2/CeO_2$ powders were then poured through a 60 mesh size stainless steel sieve to separate the alumina grinding media from the mixed powders. The starting $CeO_2$ powder has a surface area of 1.70 $m^2/g$ and a density of 7.65 $g/cm^3$. The starting $ThO_2$ powder has a surface area of 4.32 $m^2/g$ and a density of 10.00 $g/cm^3$. The total volume of 17.20 g of $CeO_2$ is calculated to be 2.25 $cm^3$. The total volume of 237.60 g of $ThO_2$ is calculated to be 23.76 $cm^3$. The volume fraction of 17.20 g of $CeO_2$ is calculated to be 8.64%. The volume fraction of 237.60 g of $ThO_2$ is calculated to be 91.36%. The surface area of the $CeO_2/ThO_2$ mixture powder is calculated to be 4.10 $m^2/g$ based on the volume fraction of $CeO_2$ and $ThO_2$, respectively. The density of the $CeO_2/ThO_2$ mixture powder is also calculated by the total weight of $CeO_2$ and $ThO_2$ (254.80 g) divided by the total volume (26.01 $cm^3$). The calculated density is 9.80 $g/cm^3$, which is also called the theoretical density.

EXAMPLE 2

General procedure for preparing a green pellet using mixed powder prepared according to Example 1. 3 grams of powders obtained from Example 1 were loaded into a 12.25 mm diameter steel die with the lower plunger in a fixed depth supported by a fixture. The whole assembly with powders was pre-packed on a vibratory table to enhance the powder packing. The top plunger was then added to the top of the die cavity and the dry pressing was performed at various pressures using a table top press. After ejection from the die, the green density was calculated by measuring the weight, diameter and thickness of the first-green-body. The green density was converted to "% of theoretical density" by dividing the green density by the theoretical density of the mixture at 9.80 $g/cm^3$.

EXAMPLE 3

A first-green-body was pressed at 25,000 psi according to Example 2 using 3 grams of the powder obtained from Example 1. The green density was measured at 4.91 $g/cm^3$, which is calculated as 50.2% theoretical density. The first-green-body was sintered at 1700° C. for 2 hours in an air furnace. The density of the sintered pellet was 8.851 g/cm³ as determined by the Archimedes method. This sintered density is calculated to be 90.31% theoretical density.

EXAMPLE 4

Preparation of granulated powder mixture of $CeO_2$ and $ThO_2$ and dispersant. 0.64 gram of Darvan C was added as a dispersant to a 500 ml polyethylene bottle filled with 12.7 mm size high purity alumina grinding media followed by adding 140 ml of deionized water. 17.2 g of $CeO_2$ powders was added to the Darvan C/water mixture and the bottle was milled for about 10 minutes at 200 rpm to pre-disperse $CeO_2$ powders. 237/6 g of $ThO_2$ powders was then added to the $CeO_2$ slurry and mixed for another 2 hours. The well-mixed $ThO_2$/$CeO_2$ slurry was then poured into a 150 ml glass beaker and dried on a hot plated at 90° C. overnight using a magnetic stirrer to minimize $ThO_2$ settling from $CeO_2$. The dried cake was then heat treated in air at 400° C. for 1 hour to remove all of the moisture and to burn-out the Darvan C. The heat treated cakes were crushed and ground using a high purity $Al_2O_3$ mortar and pestle and screened through a 60 mesh size stainless steel sieve. The surface area was measured to be 4.08 m²/g using a surface area measurement instrument made by QUANTACHROME Instruments. This 4.08 m²/g has almost the same as the surface area of the starting mixed powders calculated for Example 1 (4.10 m²/g).

EXAMPLE 5

A second-green-body was pressed at 25,000 psi as described in the pressing procedure from Example 2 using the powder obtained from Example 4. The green density was measured at 5.31 g/cm³, which is calculated to be 54.2% theoretical density. The second-green-body was sintered at 1700° C. for 2 hours in an air furnace. The density of the sintered pellets was 9.047 g/cm³ as determined by the Archimedes method. This sintered density is calculated to be 92.31% theoretical density. FIG. 1 is the scanning electron micrograph showing the non-uniform pore distribution of the sample. As can be seen from this micrograph, there are large pores within the microstructure and pore distribution is not very uniform because of the bad compaction caused by the bad flowing of the fine powders.

EXAMPLE 6

60 grams of powders processed in the same way as in Example 4 were loaded into a 31.7 mm diameter stainless steel die with the lower plunger in a fixed depth supported by a fixture. The whole assembly with powders was pre-packed on a vibratory table to enhance the powder packing. The top plunger was then added to the top of the die cavity and the dry pressing was performed at 20,000 psi pressures using a table top press. The 31.7 mm first-green-body without bonding process at a high temperature were then crushed and ground using a high purity alumina mortar and pestle. The ground granules were then screened through a −60/+275 mesh combination stainless steel sieve to obtain the final-granules. The small size granules that passed through the 275 mesh (−275 mesh) was stored in a separate bottle and was used as the source powders for the pre-compacting process.

EXAMPLE 7

A second-green-body was pressed at 25,000 psi in the same way as in Example 2 using the final-granules obtained in the same way as in Example 6. The green density was measured at 5.519 g/cm³, which is calculated to be 56.31% theoretical density. The second-green-body was sintered at 1700° C. for 2 hours in an air furnace. The density of the sintered pellets was 9.075 g/cm³ as determined by the Archimedes method. This sintered density is calculated to be 92.60% theoretical density.

EXAMPLE 8

60 grams of powders processed in the same way as in Example 4 were loaded into a 31.7 mm diameter stainless steel die with the lower plunger in a fixed depth supported by a fixture. The whole assembly with powders was pre-packed on a vibratory table to enhance the powder packing. The top plunger was then added to the top of the die cavity and the dry pressing was performed at 20,000 psi pressures using a table top press to obtain the first-green-body. The first-green-body was heat treated at 1500° C. for 1 hr in an air furnace to obtain the first-compact. The heat treated discs were crushed and ground and screened in the same way as Example 6. The surface area of the final-granules was measured to be 0.8 m²/g. The surface area was very low compared to the granules processed in the same way as Example 6. Such a low surface area is an indication that a severe reaction among the starting powders occurred at 1500° C. This severe reaction formed too strong of bonding among the raw powders and made the granules too hard to be crushed during the dry pressing action.

EXAMPLE 9

A second-green-body was pressed at 25,000 psi in the same way as in Example 2 using the granules obtained in the same way as in Example 8. The green density was measured at 6.046 g/cm³, which is calculated to be 61.58% theoretical density. The second-green-body was sintered at 1700° C. for 2 hours in an air furnace. The density of the sintered pellets was 8.761 g/cm³ as determined by the Archimedes method. This sintered density is calculated as 89.40% theoretical density. This example indicates that heat treatment (i.e. bonding) at 1500° C. resulted in extremely strong bonding for the granule to retain its size and shape. This extreme bonding can be judged from the low surface area of the screened granules. Although these strong final-granules flow easily and have higher compaction density, they cannot be crushed easily during the pressing action. Final-granules that are un-deformable or difficult to crush leave a large numbers of large pores inside the second-green-body. These large pores have a tendency to remain open during the sintering process, which lead to a low sintered density.

EXAMPLE 10

60 grams of powders processed in the same way as in Example 4 were loaded into a 31.7 mm diameter stainless steel die with the lower plunger in a fixed depth supported by a fixture. The whole assembly with powders was pre-packed on a vibratory table to enhance the powder packing. The top plunger was then added to the top of the die cavity and the dry pressing was performed at 20,000 psi pressures using a table top press to obtain the first-green-body. The first-green-body was heat treated at 1000° C. for 1 hr in an air furnace. The heat treated discs were crushed and ground and screened in the same way as Example 6. The surface area of the final-granules was measured at 4.00 m²/g using a surface area measurement instrument made by QUANTACHROME Instruments. This 4.00 m²/g is only slightly less than the surface area of the starting mixed powders calculated at 4.10 m²/g as shown in example 1 as well as the 400° C. heat treated powder measured at 4.08 m²/g in example 4. Such a comparable surface area is an indication that a slight reaction among the fine powders occurred at 1000° C. This slight reaction formed weak bonding among the fine powders and made the final-granules strong enough to retain their size and weak enough for hem to be crushed during the dry pressing action.

EXAMPLE 11

A second-green-body was pressed at 25,000 psi in the same way as in Example 2 using the final-granules obtained in the same way as in Example 10. The green density was measured at 5.723 g/cm³, which is calculated to be 58.40% theoretical density. The second-green-body was sintered at 1700° C. for 2 hours in an air furnace. The density of the sintered pellets was 9.195 g/cm³ as determined by the Archimedes method. This sintered density is calculated to be 93.83% theoretical density. This example confirms that the heat treatment at a high temperature to form weak bonding is very beneficial to the second-green-body because the weak bonding provides bonding strong enough to retain the size of the final-granules and weak enough to be crushed during the dry pressing action. The high green density and uniform pore size distribution result in a high sintered density that is higher than the sintered densities obtained in the same way as examples 3, 5, 7, and 9.

EXAMPLE 12

Figure 2:
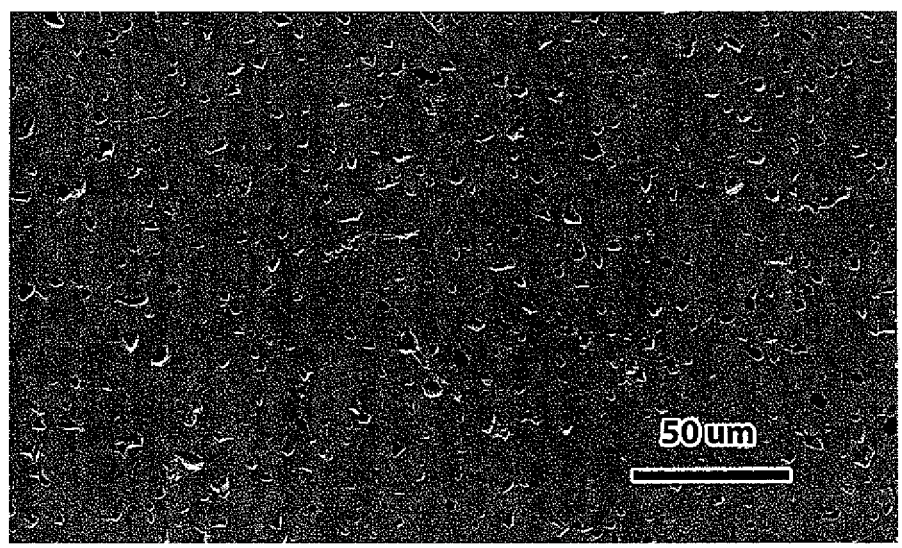
FIG. 2 is a scanning electron micrograph showing the uniform pore distribution of a sample processed from Example 12.

A second-green-body was pressed in the same way as in Example 10 using the granules obtained in the same way as in Example 10. The second-green-body was sintered at 1700° C. for 4 hours in an air furnace. The density of the sintered pellets was 9.228 g/cm³ as determined by the Archimedes method. This sintered density is calculated to be 94.16% theoretical density. This example indicates that the longer sintering time results in a higher density for the final-granules processed from this invention. FIG. 2 is the scanning electron micrograph showing the uniform pore distribution of sample sintered at 1700° C. for 2 hours in an air furnace. As can be seen from this micrograph, there are no large pores within the microstructure and pore distribution is uniform because of the good compaction accomplished by the granulation from this invention.

EXAMPLE 13

A second-green-body was pressed in the same way as in Example 12 using the final-granules obtained in the same way as in Example 12 except the compaction to form the first-green-body was performed at 15,000 psi. The second-green-body was pressed at 25,000 psi in the same way as in Example 12. The green density of the second-green-body was measured at 5.720 g/cm³, which is calculated as 58.37% theoretical density. The green density is almost the same as that in Example 12. This example indicates that any reasonable pressing pressure can be used for the first-green-body. The sintering was performed in the same way as in Example 12, The second-green-body was sintered at 1700° C. for 4 hours in an air furnace in the same way as in Example 12. The density of the sintered pellets was 9.228 g/cm³ as determined by the Archimedes method. This sintered density is calculated as 94.16% theoretical density. This example indicates that any reasonable pressing pressure can be used for the first-green-body.

EXAMPLE 14

A second-green-body was pressed in the same way as in Example 12 using the granules obtained in the same way as in Example 12 except the final-granule was screened between −60/+325 meshes. The green density of the second-green-body was measured at 5.720 g/cm³, which is calculated to be 58.37% theoretical density. The green density is almost the same as that obtained in the same way as Example 12. This example indicates that any reasonable screen combinations can be used for the crushed and ground first-compact. The sintering was performed in the same way as in Example 12. The second-green-body was sintered at 1700° C. for 4 hours in an air furnace in the same way as in Example 12. The density of the sintered pellets was 9.228 g/cm³ as determined by the Archimedes method. This sintered density is calculated to be 94.16% theoretical density. This sintered density is calculated to be 94.16% theoretical density. The sintered density is very close to the sintered density obtained in the same way as Example 12. This example indicates that any reasonable screen combinations can be used for the crushed and ground pre-compaction.

The EXAMPLES above were small scale procedures. It should be understood that these procedures can be scaled up so that much larger sized batches can be obtained. For example, larger scales include several kilograms, several hundred kilograms, and higher. The procedures may also be applied to the preparation of other materials, such as a material containing thorium and one of uranium oxide or plutonium oxide. For example, an embodiment may include a process for forming a pellet of nuclear fuel with at least one of thorium oxide, plutonium oxide and uranium oxide that would involve forming a first-green-body from a powder mixture of thorium oxide with at one selected from plutonium oxide and uranium oxide, heating the first-green-body under conditions effective for improving bonding, and thereafter granulating the heat treated first-green-body to form granulated powder, forming a second-green-body from the granulated powder, and sintering the second-green-body to form a dense compact.

The foregoing description of the invention has been presented for purposes of illustration and description and is not intended to be exhaustive or to limit the invention to the precise form disclosed, and obviously many modifications and variations are possible in light of the above teaching.

The embodiments were chosen and described in order to best explain the principles of the invention and its practical application to thereby enable others skilled in the art to best utilize the invention in various embodiments and with various modifications as are suited to the particular use contemplated. It is intended that the scope of the invention be defined by the claims appended hereto.

What is claimed is:

1. A process for granulating fine powder, the process comprising:
mixing a fine powder having a particle size in a range from 10 nm to 1 mm by dry mixing or wet mixing, the fine powder including cerium oxide and at least one radioactive compound;
forming a first-green-body from the mixed powder;
heat treating the first-green-body to a temperature in a range from 100 to 2000 degrees C. to strengthen the structure of the first-green-body;
forming granulated powder by crushing or milling the heat-treated first-green-body; and
filtering the granulated powder.

2. The process of claim 1, wherein the step of forming the first-green-body further includes applying heat in a vacuum or a gaseous environment, the gaseous environment including at least one gas selected from nitrogen, air, argon, and helium.

3. The process of claim 1, wherein the radioactive compound includes a radioactive compound of Th, Pa, U, Np, Pu, Am, Cm, or Bk.

4. The process of claim 3, wherein the radioactive compound includes an oxide, a nitride, a fluoride, a chloride, a bromide, an iodide, a sulfide, or combinations thereof.

5. The process of claim 1, wherein forming the first-green-body includes applying a pressing pressure in a range from 1 psi to 40,000 psi.

6. The process of claim 1, wherein the step of forming the first-green-body includes dry pressing, cold isostatic pressing, roll compaction, or dry bag isostatic pressing.

7. The process of claim 1, wherein the granulated powder contains no organic binder.

8. The process of claim 1, wherein the granulated powder includes a total surface area reduced by 0.00001 to 80% compared to a total surface area of the fine powder.

9. A process for forming a compact, the process comprising:
   mixing a fine powder having a particle size in a range from 10 nm to 1mm by dry mixing or wet mixing, the fine powder including cerium oxide and at least one radioactive compound;
   forming a first-green-body from the mixed powder;
   heat treating the first-green-body to a temperature in a range from 100 to 2000 degrees C. to strengthen the structure of the first-green-body;
   forming granulated powder from the first-green-body;
   filtering the granulated powder;
   forming a second-green-body from the granulated powder; and
   sintering the second-green body under conditions effective for forming a dense radioactive compact.

10. The process of claim 9, wherein the step of forming the first-green-body further includes applying heat in a vacuum or a gaseous environment, the gaseous environment including at least one gas selected from nitrogen, air, argon, and helium.

11. The process of claim 9, wherein the radioactive compound includes at least one of radioactive compound of Th, Pa, U, Np, Pu, Am, Cm, or Bk.

12. The process of claim 11, wherein the radioactive compound includes an oxide, a nitride, a fluoride, a chloride, a bromide, an iodide, a sulfide, or combinations thereof.

13. The process of claim 9, wherein forming the first-green-body includes applying a pressing pressure in a range from 1 psi to 40,000 psi.

14. The process of claim 9, wherein the step of forming the first-green-body includes dry pressing, cold isostatic pressing, roll compaction, or dry bag isostatic pressing.

15. The process of claim 9, wherein the granulated powder contains no organic binder.

16. The process of claim 9, wherein the step of forming the second-green-body includes pressing the granulated powder in a die using a pressure in a range from 1 psi to 100,000 psi.

17. The process of claim 9, wherein the step of sintering the second-green-body includes heating the second-green-body at a temperature within a range from 400 degrees C. to 2500 degrees C.

18. The process of claim 9, wherein the granulated powder includes a total surface area reduced by 0.00001 to 80% compared to a total surface area of the fine powder.

* * * * *